US005968308A

United States Patent [19]

Lindsay

[11] Patent Number: 5,968,308

[45] Date of Patent: Oct. 19, 1999

[54] METHOD FOR PRESSURE SEALING

[75] Inventor: Timothy D. Lindsay, Dover, N.H.

[73] Assignee: Bescorp, Inc., Dover, N.H.

[21] Appl. No.: 09/032,962

[22] Filed: Mar. 2, 1998

Related U.S. Application Data

[62] Division of application No. 08/578,246, Dec. 26, 1995, Pat. No. 5,772,841.

[51] Int. Cl.[6] ............................ B32B 31/20; B42O 15/08

[52] U.S. Cl. .......................... 156/312; 156/227; 156/290; 156/306.3

[58] Field of Search .................................... 156/227, 290, 156/306.3, 308.2, 308.4, 312, 555; 493/405, 435

[56] References Cited

U.S. PATENT DOCUMENTS

| | | | |
|---|---|---|---|
| 2,994,261 | 8/1961 | Cook | 100/171 |
| 5,133,828 | 7/1992 | Jacques | 156/555 |
| 5,169,489 | 12/1992 | Kalisiak et al. | 156/555 |
| 5,183,527 | 2/1993 | Parker | 156/555 |
| 5,290,385 | 3/1994 | Downing et al. | 156/350 |
| 5,397,427 | 3/1995 | Traise et al. | 156/555 |

*Primary Examiner*—Richard Crispino
*Attorney, Agent, or Firm*—Donald Cayen

[57] ABSTRACT

An in-line pressure sealer processes folded sheets with pressure sensitive adhesive into finished business forms. The in-line pressure sealer has pairs of infeed and outfeed rollers, each with a predetermined clearance therebetween. The clearances are adjustably set by means of screws coacting with a frame and with bearing blocks that rotatably mount the rollers. The infeed and outfeed clearances are adjustable independently of each other. The rollers of each pair are biased away from each other to maintain the clearances when no form is present between the rollers. The folded sheets are guided to the infeed rollers by a first cross-piece and to the outfeed rollers by a second cross-piece. A motor, acting through suitable pulleys and belts, drives the infeed and outfeed rollers.

6 Claims, 4 Drawing Sheets

METHOD FOR PRESSURE SEALING

This is a divisional of application Ser. No. 08/578,246, filed on Dec. 26, 1995, now U.S. Pat. No. 5,772,841.

BACKGROUND OF THE INVENTION

1. Field of the Invention

This invention pertains to handling sheets of paper, and more particularly to apparatus and methods for sealing a folded sheet of paper to itself.

2. Description of the Prior Art

Numerous types of business forms have been developed over the years. Many kinds of business forms are used as mailers. An example of a multi-page mailer type business form may be seen in U.S. Pat. No. 5,167,739.

Business forms are usually constructed as sheets of paper having patterns of pressure sensitive adhesive applied to one surface. The sheets are folded in a desired manner by a folding machine such that certain portions of the sheet come into facing contact with the adhesive. The folded sheets are then pressed together, which causes them to adhere to each other along the patterns of adhesive.

Prior equipment for pressing folded sheets together include the reversing machines of U.S. Pat. Nos. 5,133,828; 5,290,385; and 5,300,177. In those machines, a force biases one or more rollers into contact with mating rollers. A folded sheet is fed in a first direction into a roller nip until the sheet has almost completely passed through the nip. Then the rollers are reversed to drive the sheet through the nip again in the opposite direction. The biasing force is strong enough to activate the adhesive and thus create a finished business form.

A primary disadvantage of the machines of the foregoing patents is the noise produced by the contacting rollers when no folded sheets are in the nips. Another disadvantage is that the finished forms leave the machines at the same locations that they entered the machines. Consequently, second folded sheets cannot be fed to the nips until the previous forms have been discharged and removed from the nips.

U.S. Pat. No. 5,169,489 shows a pressure sealer system having four nips, two at one level and two at a higher level. The rollers of each nip are pressed together by spring biasing devices. Folded sheets are fed in a first direction between the two lower nips. Thereafter, the folded sheets pass to a higher elevation and reverse direction to pass through the two higher nips. Because of the four nip and reversing construction, the machine of the U.S. Pat. No. 5,169,489 patent is quite complicated as well as undesirably noisy. In addition, the reversing direction of the folded sheets complicates both the feeding of the folded sheets into the machine and the removal of the completed business forms from the machine.

U.S. Pat. No. 5,183,527 describes a seal module in which one roller of a nip is spring biased to be non-parallel to another roller when no form is present. When a form is a-fed to the nip, the form forces the rollers against the force of the spring into a parallel relationship. The forms travel in one direction in the downstream direction through the seal module. There is no adjustment for the linear distance between the rollers, thus limiting the versatility of the seal module. In addition, initial setup of the seal module can be rather tricky.

U.S. Pat. No. 5,397,427 discloses a pressure seal system in which two rollers of a nip are pressed into contact with each other by a biasing force. Forms passing through the nip are acted on by the biasing force but spread the rollers apart as they pass through the nip. The forms pass in one direction through the pressure sealer. The amount of noise as well as the wear on the rollers are important disadvantages of the seal system of the U.S. Pat. No. 5,397,427 patent.

Thus, a need exists for improvements in machines that seal folded business forms.

SUMMARY OF THE INVENTION

In accordance with the present invention, an in-line pressure sealer is provided that produces forms in a simpler, quieter, and more efficient manner than was previously possible. This is accomplished by apparatus that includes two pairs of rollers that are biased away from each other to adjustable but positively maintained distances between them.

One pair of rollers, consisting of first and second rollers, serve as input rollers that form an infeed nip. The other pair of rollers, consisting of third and fourth rollers, form an outfeed nip. Each roller is mounted at its opposite ends for rotation in respective blocks. The blocks are received in a frame. According to one aspect of the invention, the blocks of the infeed rollers are received in first slots in the frame, and the outfeed roller blocks are received in second slots in the frame.

The blocks of the first and third rollers are stationarily located against ends of the associated frame slots. The blocks of the second and fourth rollers are free to slide in the frame slots. Springs bias the blocks of the second and fourth rollers away from the blocks of the first and third rollers. Positive stops limit the motions of the blocks of the second and fourth rollers and thus the clearances between the infeed rollers and the outfeed rollers. The locations of the positive stops for the infeed and outfeed rollers are independently adjustable relative to the frame.

An infeed roller is driven by a conventional electric motor, suitable pulleys, and a belt. An outfeed roller is driven by the driven infeed roller. In turn, the driven outfeed roller drives the other infeed and outfeed rollers. A folded sheet fed in a downstream direction to the infeed nip is propelled through that nip in the same downstream direction to the outfeed nip. The outfeed nip discharges a completed form from the pressure sealer in the same downstream direction as the folded sheet was fed to the infeed nip.

The clearances between the infeed and outfeed rollers are set to suit a particular folded sheet and strips of pressure sensitive adhesive applied to the sheet. For example, the clearance of the infeed rollers can be set to burst the bubbles of the pressure sensitive adhesive. The clearance of the outfeed rollers can then be set to activate the adhesive such that the facing portions of the folded sheet adhere to each other along the adhesive strips. As a result, a completed and properly sealed form is discharged from the outfeed rollers.

Because the rollers never touch, operation of the invention is very quiet. Further, since the springs maintain the clearances between the rollers when no forms are present, the non-contacting nature of the rollers precludes the possibility that they can produce wear on each other.

To guide the folded sheets to the infeed and outfeed nips, the in-line pressure sealer further comprises a pair of cross-pieces that are joined to the frame. One cross-piece is located a short distance upstream of the infeed nip, and the second cross-piece is located between the two nips. The cross-pieces have respective flat surfaces that are coplanar with each other and with a plane that extends between the two nips. The folded sheets are guided to the infeed nips by the first cross-piece, and the second cross-piece guides the folded sheets from the infeed nip to the outfeed nip.

The method and apparatus of the invention, using pairs of non-contacting rollers having adjustably fixed clearances therebetween, thus discharges completed forms from the outfeed nip in the same direction as folded sheets are fed to the infeed nip. The clearances between the rollers of each pair can be adjusted independently of each other to suit different sheet stocks and adhesives.

Other advantages, benefits, and features of the present invention will become apparent to those skilled in the art upon reading the detailed description of the invention.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring first to, FIGS. 1–4, an in-line pressure sealer 1 is illustrated that includes the present invention. The in-line pressure sealer 1 is particularly useful for sealing folded sheets of paper into completed business forms, but it will be understood that the invention is not limited to form processing applications.

Figure 5:
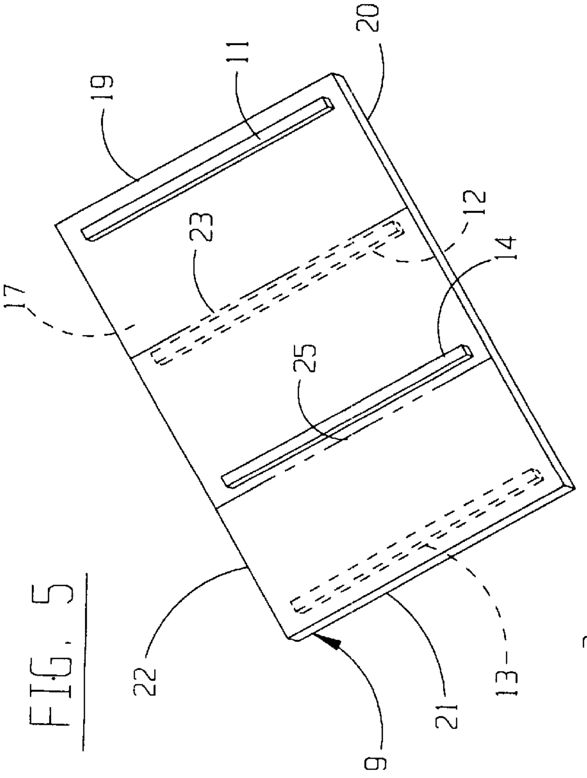
FIG. 5 is a perspective view of a typical sheet with strips of pressure sensitive adhesive applied thereto that can be processed into a completed business form by the present invention.
Figure 7:
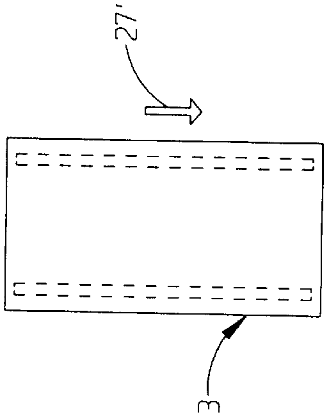
FIG. 7 is a top view of FIG. 6.
Figure 6:
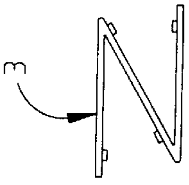
FIG. 6 is a front view of the sheet of FIG. 5 folded into a Z fold.
Figure 8:
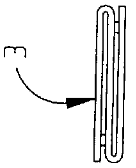
FIG. 8 is an end view of a completed business form processed by the present invention.

The in-line pressure sealer 1 is located downstream from a conventional folding machine 7. I have found that a model D-590 Auto-Folder machine manufactured by Duplo U.S.A. Corporation of Santa Ana, Calif., works very well with the in-line pressure sealer. In the folding machine 7, sheets of paper having preselected patterns of pressure sensitive adhesive applied to one or both surfaces are folded along desired fold lines. By way of example, FIG. 5 shows a sheet of paper 9 having four strips 11, 14 and 12, 13 of pressure sensitive adhesive applied to opposite surfaces 15 and 17, respectively, along the sheet edges 19 and 21. Although not shown, similar strips of pressure sensitive adhesive can also be applied along the sheet edges 20 and 22. In the folding machine, the sheet 9 is folded along fold lines 23 and 25 into a Z folded sheet 3, FIGS. 6 and 7. The folded sheet 3 is fed in the downstream direction 27, FIG. 1, by belts, not shown, on the folding machine to the in-line pressure sealer 1. The downstream direction 27 relative to the folded sheet is in the direction of arrow 27' in FIG. 7.

In the construction illustrated in FIGS. 1–4, the in-line pressure sealer 1 is comprised of a frame 29 that includes a base plate 33. The base plate 33 is attached in any convenient manner to the folding machine 7. Secured to the base plate by conventional fasteners 34 are a pair of parallel channels 35. Two vertically oriented side plates 37 rest on the base plate and are fastened each to a channel 35 by fasteners 38. There is a side cover 39 mounted by means of a main panel 40 to each channel on the opposite side thereof as the corresponding side plate 37. The side covers 39 are held in place by fasteners 42. Each side cover has a short bent-over panel 41 that is screwed to the end of an associated side plate by fasteners 44. An L-shaped top cover 43 rests on and extends between the short panels 41 and bent-over top tabs 45 of the side covers.

Figure 1:
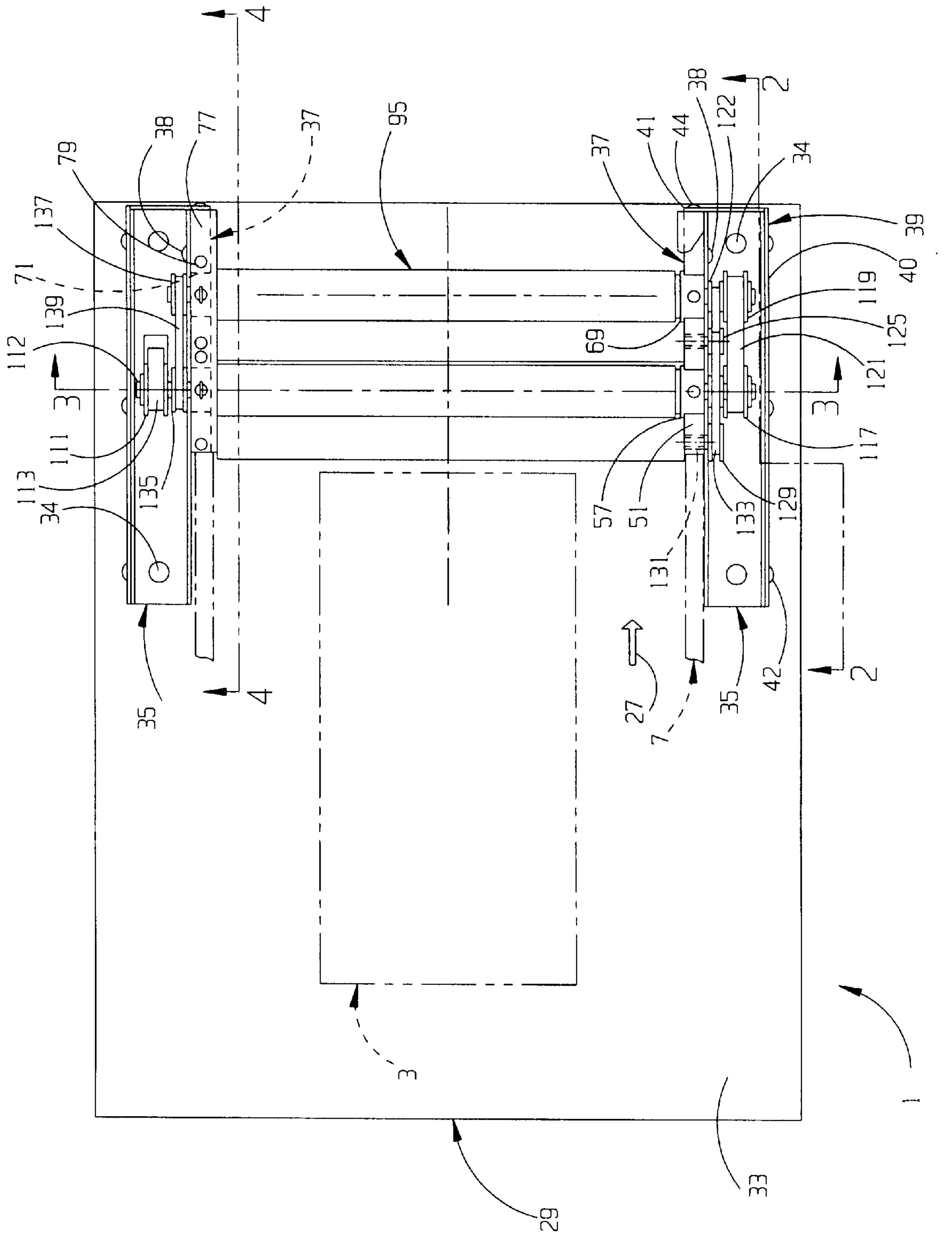
FIG. 1 is a partially broken top view of the invention.

Each side plate 37 is fabricated with first and second vertically oriented slots 47 and 49, respectively, extending from the side plate top surface 51. Slidingly received in the first slot 47 of each side plate are upper and lower infeed bearing blocks 53 and 55, respectively. Both infeed bearing blocks 53 and 55 have oppositely extending flanges 57 and 59, respectively, thereby giving the bearing blocks a T-shaped cross section (FIG. 1). There is a bore 61 through each upper infeed bearing block, and a similar bore 63 extends through each lower infeed bearing block. Similar outfeed bearing blocks 65 and 67 are received in the slots 49 of each side plate. The upper outfeed bearing blocks 65 have respective flanges 69 and bores 71; the lower outfeed bearing blocks 67 have similar flanges and bores. A cap 77 is mounted by screws 79 to the top surface 51 of each side plate. The bearing block flanges 57, 59, and 69 guide the bearing blocks in the side plate slots 47 and 49.

Interposed between the upper and lower infeed bearing blocks 53 and 55, respectively, in each side plate 37 is a compression spring 81. Similar springs 83 are located between the outfeed bearing blocks 65 and 67. The springs 81 and 83 fit within counterbores 84 in the bearing blocks. Adjusting bolts 85 and 87 are threaded into each cap 77 and bear against associated upper infeed and outfeed bearing blocks 53 and 65, respectively.

The adjusting bolts 85 and 87 and the springs 81 and 83 cooperate to locate the bearing blocks 53, 55 and 65, 67 relative to each other. Specifically, the springs 81 bias the infeed bearing blocks away from each other. The end surfaces 89 of the first side plate slots 47 contact the lower infeed bearing blocks and locate them at fixed locations. The adjusting bolts 85 locate the upper bearing blocks 53. By adjusting the adjusting bolts 85, the locations of the upper bearing blocks relative to the lower bearing blocks is adjusted. Consequently, the center distance between the bores 61 and 63 is also adjusted by the adjusting bolts 85. The identical situation occurs for the outfeed bearing blocks 65 and 67, the springs 83, and the adjusting bolts 87.

Rotatably mounted in the bores 61 of the two upper infeed bearing blocks 53 by means of roller bearings 89 is an upper infeed roller 91. Similarly, there is a lower infeed roller 93 between the bearing blocks 55, an upper outfeed roller 95 between the bearing blocks 65, and a lower outfeed roller 97 between the bearing blocks 67. The upper and lower infeed rollers 91 and 93, respectively, cooperate to form an infeed nip. The upper and lower outfeed rollers 95 and 97, respectively, cooperate to form an outfeed nip. The clearance between the infeed rollers is set by adjusting the adjusting bolts 85; the clearance between the outfeed rollers is set by adjusting the adjusting bolts 87.

The in-line pressure sealer 1 also includes a pair of cross-pieces 99 and 101. Both cross-pieces 99 and 101 extend between and are joined to the side plates 37 by means of right angle tabs 102 and screws 105. The cross-pieces have respective horizontal surfaces 103 that are located generally coplanar with each other and generally coplanar with a plane extending between the infeed and outfeed nips. The cross-piece 99 is located on the upstream side of the infeed nip, and the cross-piece 101 is located between the infeed and outfeed nips.

To rotate the rollers 91, 93, 95, and 97, the in-line pressure sealer 1 further includes an electric motor 106. A suitable motor is a ⅙ horsepower motor manufactured by Minneapolis Electronic Technology of Minneapolis, Minn. In the preferred embodiment, the motor 106 is fixed to the underside of the base plate 33 by means of motor feet 108 and screws 110. There is a drive pulley 107 on the motor shaft 109. A similar driven pulley 111 is connected to one end 112 of the lower infeed roller 93. An infeed belt 113 is trained over the pulleys 107 and 111. Connected to the second end 115 of the lower infeed roller is a pulley 117; a similar pulley 119 is connected to the lower outfeed roller 97. An outfeed belt 121 is trained over the pulleys 117 and 119.

Figure 2:
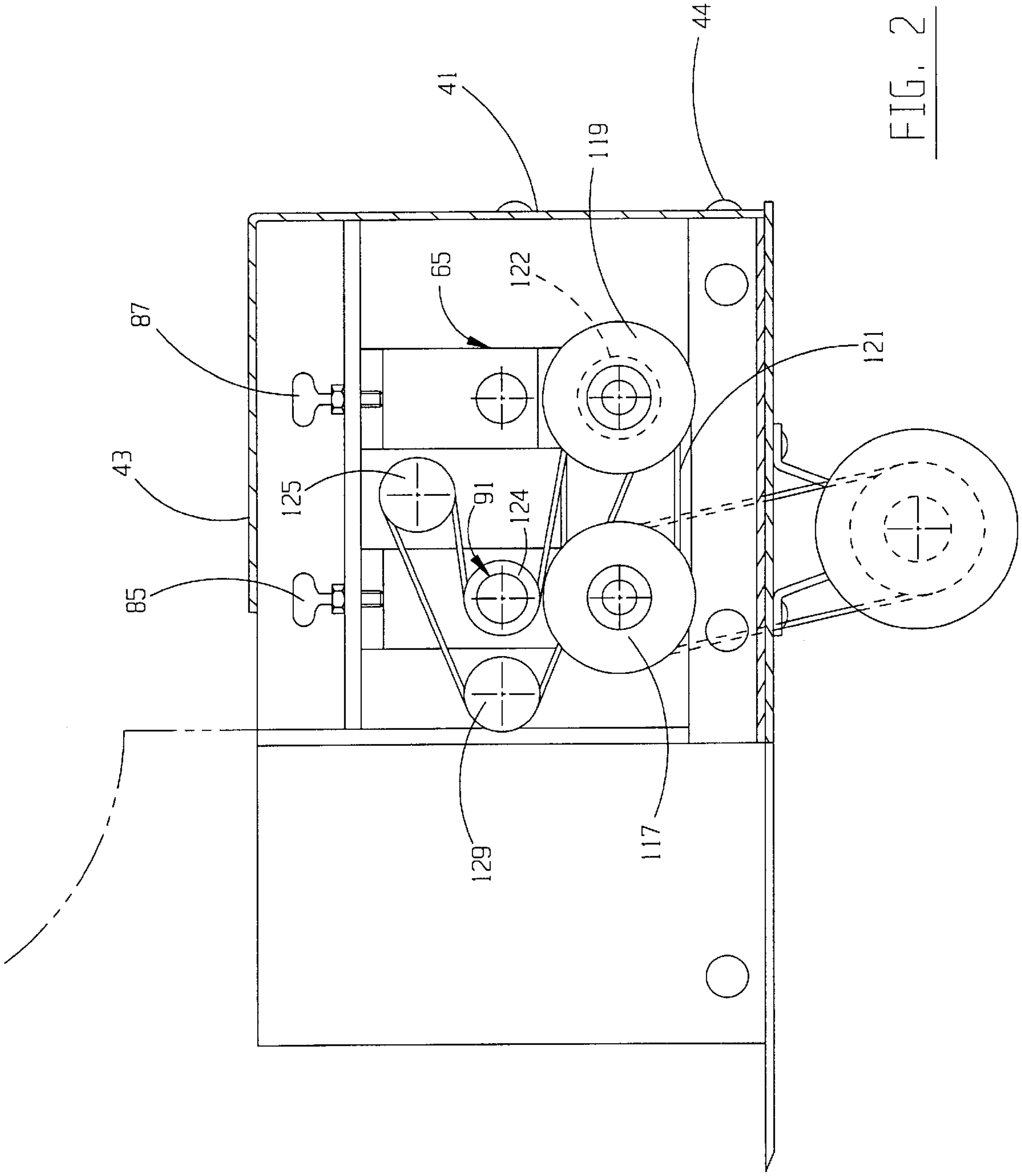
FIG. 2 is a cross sectional view taken along line 2—2 of FIG. 1.
Figure 3:
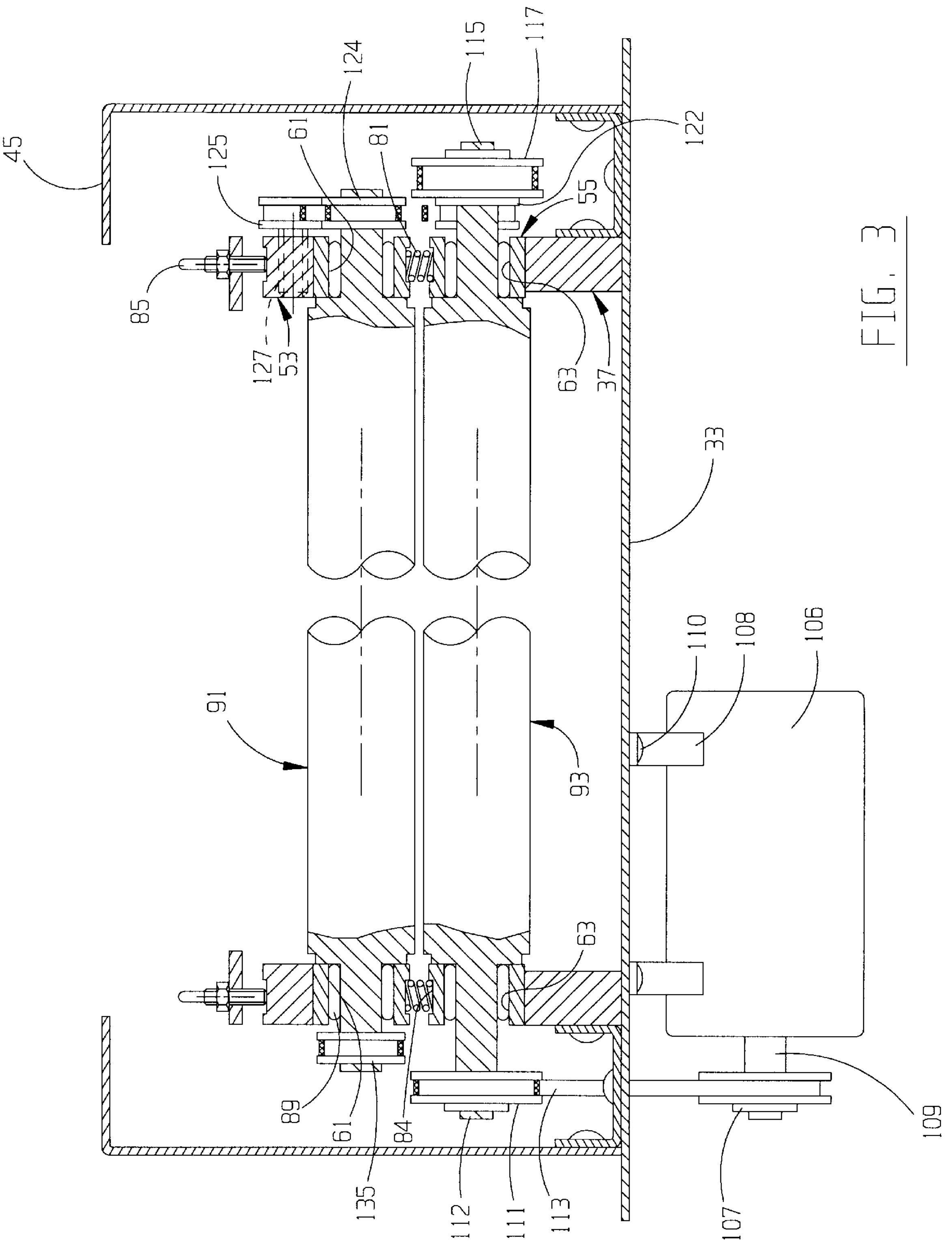
FIG. 3 is a cross sectional view on an enlarged scale taken along line 3—3 of FIG. 1 and rotated 90 degrees counter-clockwise.
Figure 4:
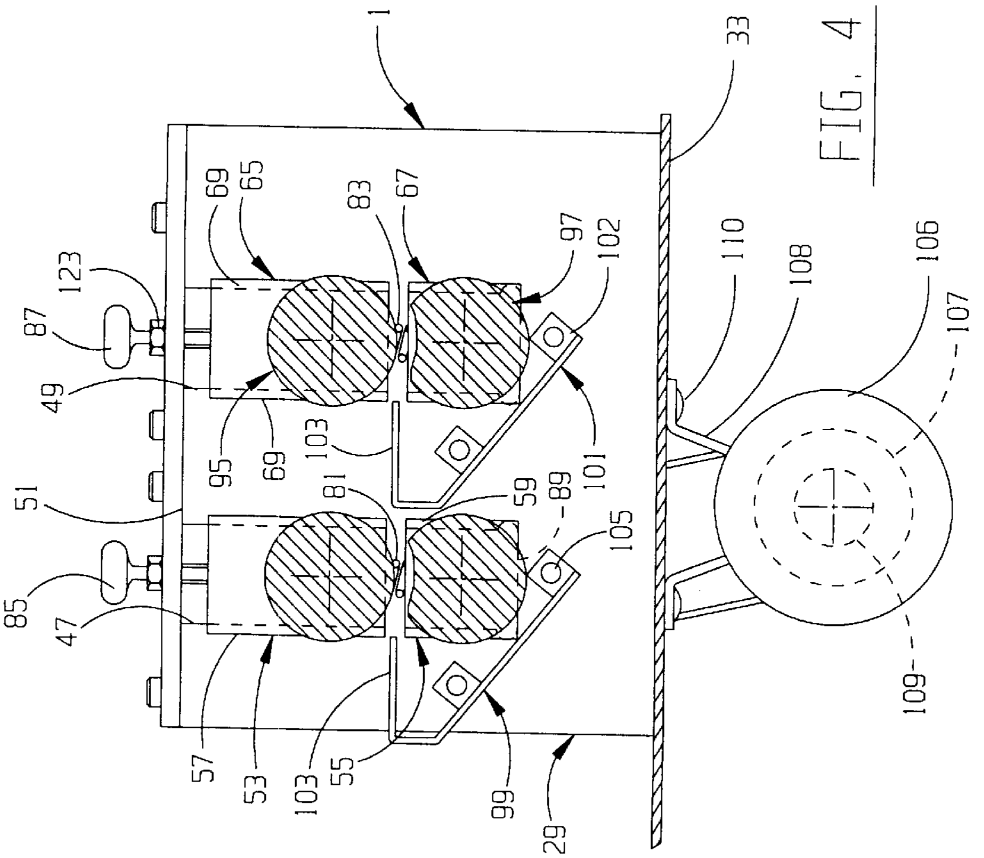
FIG. 4 is a cross sectional view on an enlarged scale taken along line 4—4 of FIG. 1.

Also connected to the lower outfeed roller 97 adjacent the pulley 119 is another pulley 122. There is a similar pulley 124 on the upper infeed roller 91. A first idler pulley 125 is rotatably mounted on a stub shaft 127 that is threaded or otherwise held in the side plate 37 between the slots 47 and 49. A second idler pulley 129 is rotatably mounted on a stub shaft 131 threaded into the side plate between the slot 47 and the folding machine 7. A long double sided timing belt 133 is trained over the pulleys 122, 124, 125, and 129, as best shown in FIG. 2. At the opposite end of the upper infeed roller 91 as the pulley 124 is a pulley 135. The corresponding end of the upper outfeed roller 95 also has a pulley 137. A timing belt 139 is trained over the pulleys 135 and 137. Accordingly, energization of the motor 106 causes rotation of all the rollers 91, 93, 95, and 97.

In operation, the clearances between the infeed rollers 91, 93 and the outfeed rollers 95, 97 are set by the adjusting bolts 85 and 87 to suit the particular folded sheet 3 and adhesive strips 11 and 13 that are to be processed into a completed business form. Specifically, the clearance between the infeed rollers is set at a sufficiently close spacing so as to actuate the pressure sensitive adhesive on the folded sheet. The clearance between the outfeed rollers is set to cause adhesion of the activated adhesive to the facing portion of the folded sheet. For clarity, the clearances of the nips are shown greatly exaggerated in the drawings.

As a typical example, the clearance between the infeed rollers is set at 0.004 inches, and the clearance between the outfeed rollers is set at 0.001 inches. Those settings are made by adjusting the adjusting bolts 85 and 87. The springs 81 and 83 hold the rollers 91, 93 and 95, 97, respectively, apart at the clearances set by the adjusting bolts. Jam nuts 123 on the adjusting bolts maintain the desired settings. Because of the springs, the two infeed rollers never touch each other, nor do the outfeed rollers touch each other.

When electrical power is applied to the motor 106, the rollers 91, 93, 95, and 97 rotate together at the same speed. Due to the nip clearances made possible by the adjusting bolts 85 and 87 and the springs 81 and 83, the operation of the in-line pressure sealer 1 is very quiet. Further, the lack of roller contact at the nips eliminates wear of the rollers due to each other and also eliminates roller expansion from heat.

Folded sheets 3 are continuously fed by the folding machine 7 in the downstream direction 27 to the in-line pressure sealer 1. The folding machine belts deposit the folded sheets onto the cross-piece 101, which guides the folded sheet leading edge to the infeed nip. The small clearance between the infeed rollers 91 and 93 causes the folded sheet to be simultaneously propelled downstream and squeezed between the infeed rollers to activate the pressure sensitive adhesive on the folded sheet. The leading edge of the folded sheet is guided by the cross-piece 103 to the outfeed nip. The operation of the outfeed rollers is substantially similar to that of the infeed rollers to complete the process of adhering the folded sheet to itself and produce a completed business form. The in-line pressure sealer can accept and process the folded sheets at the same rate they are fed to it by the folding machine. The business forms emerge from the outfeed nip in the downstream direction 27. From the in-line pressure sealer, the business forms are collected by known equipment for further handling.

In summary, the results and advantages of business forms can now be more fully realized. The in-line pressure sealer 1 provides both the force to seal sheets 3 that are folded by a folding machine 7 and the ability to handle folded sheets and adhesive strips of different thicknesses. This desirable result comes from using the combined functions of the adjusting bolts 85 and 87 and the springs 81 and 83. The springs bias the infeed bearing blocks 53, 55 and the outfeed bearing blocks 65, 67 away from each other to positive stops adjustably set by the adjusting bolts. The adjusting bolts are set to suit a particular folded sheet and adhesive strip, but the springs maintain the desired nip clearances even when no folded sheet is present. As a result, the infeed rollers 91, 93 and the outfeed rollers 95, 97 never contact each other. The result is a very quiet and long lasting machine that can maintain the production rates of the folding machine.

It will also be recognized that in addition to the superior performance of the in-line pressure sealer 1, its construction is such as to cost no more than traditional pressure sealing machines. Also, since it is made of rugged components having a simple design, and since the rollers never contact each other during operation, the need for maintenance is minimal.

Thus, it is apparent that there has been provided, in accordance with the invention, an in-line pressure sealer that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A method of pressure sealing a folded sheet into a business form comprising the steps of:

a. setting a first predetermined clearance between a pair of infeed rollers, and setting a second predetermined clearance between a pair of outfeed rollers;

b. biasing the infeed rollers away from each other to the first determined clearance, and biasing the outfeed rollers away from each other to the second determined clearance;

c. feeding a folded sheet to the infeed rollers, propelling the folded sheet through the infeed rollers to the outfeed rollers, propelling the folded sheet through the outfeed rollers and thereby producing a completed pressure sealed business form, and discharging the completed business form from the outfeed rollers.

2. The method of claim 1 wherein the step of setting first and second predetermined clearances comprises the step of setting unequal first and second predetermined clearances.

3. The method of claim 1 wherein the step of biasing the infeed rollers and outfeed rollers away from each other comprises the steps of:

a. mounting the infeed rollers and the outfeed rollers in respective pairs of infeed and outfeed bearing blocks;

b. biasing the pairs of infeed bearing blocks away from each other to the first predetermined clearance; and c. biasing the pairs of outfeed bearing blocks away from each other to the second predetermined clearance.

4. The method of claim 3 wherein the step of setting first and second predetermined clearances comprises the steps of:

a. slidingly receiving the pairs of infeed and outfeed bearing blocks in a frame;

b. adjusting infeed screws in the frame to limit sliding of the infeed bearing blocks away from each other to the first determined clearance; and c. adjusting outfeed screws in the frame independently of the infeed screws to limit sliding of the outfeed bearing blocks away from each other to the second predetermined clearance.

5. The method of claim 3 wherein the step of biasing the infeed rollers and outfeed rollers away from each other comprises the step of interposing infeed and outfeed springs between the pairs of infeed and outfeed bearing blocks, respectively.

6. The method of claim 1 comprising the further steps of:

a. guiding the folded sheet along a first flat surface to the pair of infeed rollers; and b. guiding the folded sheet along a second flat surface from the pair of infeed to the pair of outfeed rollers.

* * * * *